(12) United States Patent
Rhodes, Jr.

(10) Patent No.: US 6,626,338 B1
(45) Date of Patent: Sep. 30, 2003

(54) ENTERTAINMENT SYSTEM CONTAINER

(75) Inventor: Robert T. Rhodes, Jr., Peru, IN (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 10/056,626

(22) Filed: Jan. 25, 2002

(51) Int. Cl.⁷ .................................................. B60R 7/00
(52) U.S. Cl. ...................... 224/275; 224/929; 296/37.1; 296/37.15
(58) Field of Search .................................. 224/275, 539, 224/929; 296/37.15, 37.1

(56) References Cited

U.S. PATENT DOCUMENTS

| | | | | |
|---|---|---|---|---|
| 4,585,196 A | * | 4/1986 | Cormier | 248/214 |
| 5,479,892 A | * | 1/1996 | Edwards | 119/771 |
| 5,775,770 A | * | 7/1998 | Tunney | 297/183.1 |
| 5,966,285 A | * | 10/1999 | Sellers | 361/686 |
| 6,390,293 B1 | * | 5/2002 | Page et al. | 206/225 |
| 6,422,440 B1 | * | 7/2002 | Stone | 224/275 |

* cited by examiner

Primary Examiner—Gregory Vidovich
Assistant Examiner—Maerena W. Brevard
(74) Attorney, Agent, or Firm—Stefan V. Chmielewski

(57) ABSTRACT

Disclosed is a container for an entertainment system where the right and left panels each have a cutout which aligns with a channel on a bottom panel. The combination of the cutouts and channel are adapted to receive a seatbelt. Also disclosed is an entertainment system which includes a container with a combination of cutouts and a channel which are adapted to receive a seatbelt. Lastly, a method securing a container to a vehicle seat is disclosed.

10 Claims, 6 Drawing Sheets

ENTERTAINMENT SYSTEM CONTAINER

FIELD OF THE INVENTION

The present invention relates to an improved method and device for the attachment of items to the rear seat of an automobile.

BACKGROUND OF THE INVENTION

As automobiles become more integral to consumers' lifestyles, those consumers demand more "creature comforts", including enhanced entertainment systems. Several considerations are involved in including an entertainment system in an automobile. Because the components of these systems are relatively expensive, they must remain portable so that the system may be utilised in more than one location. For example, the components of the entertainment system may be used in the consumer' homes when not in use in the vehicle. Thus, permanent installation or attachment of the components of the entertainment system to the vehicle is undesirable.

Safety is an important consideration also. If the components of the entertainment system are not secured or properly secured to the vehicle, then during a crash, the components could become missiles which could cause significant damage to the vehicle and occupants.

A related consideration is ease of use. The entertainment system must be easy to secure. A complicated method of securing the entertainment system will dissuade consumers from securing the system properly.

An improved device which overcome one or more problems discussed above is disclosed.

SUMMARY OF THE INVENTION

The present invention relates to a container for an entertainment system where the right and left panels each have a cutout which aligns with a channel on a bottom panel. The combination of the cutouts and channel are adapted to receive a seatbelt. The present inventions also relates to an entertainment system which includes a container with a combination of cutouts and a channel which are adapted to receive a seatbelt. Lastly, the present invention relates to a method securing a container to a vehicle seat.

DETAILED DESCRIPTION

Figure 1:
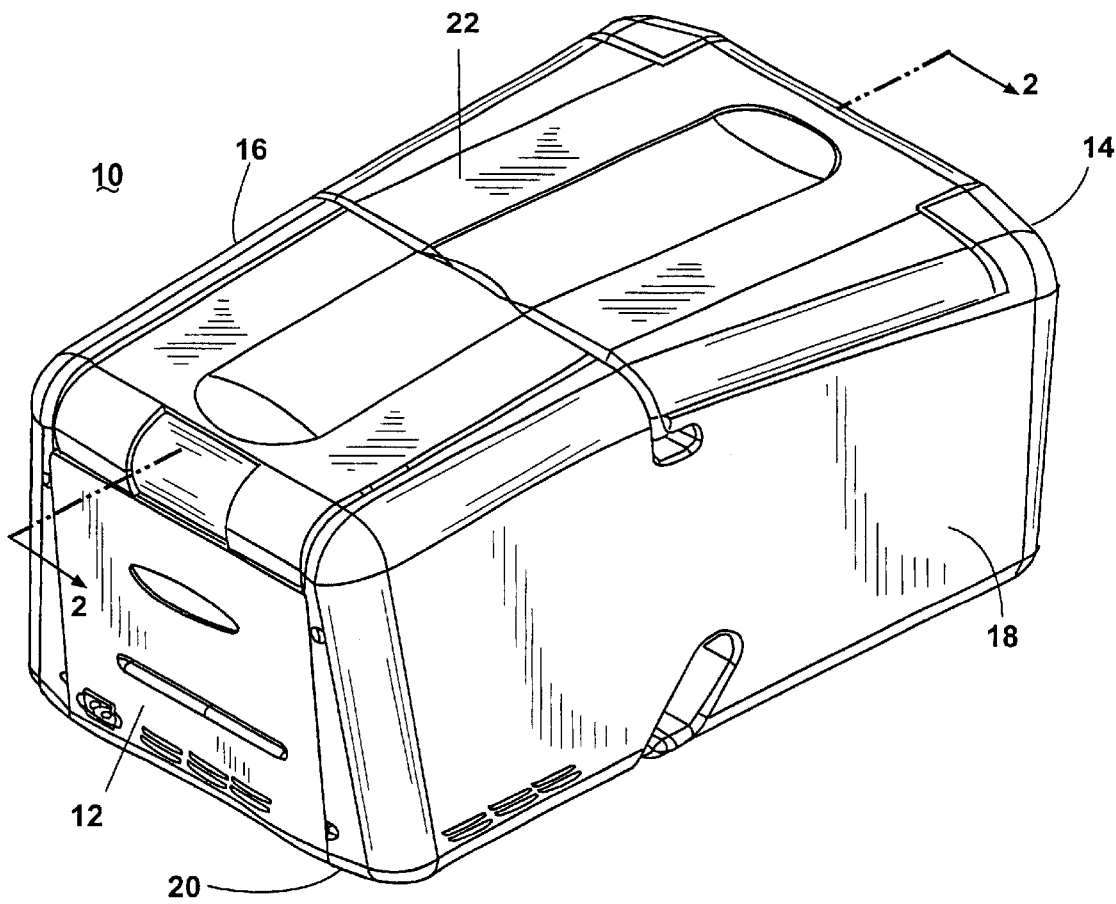
FIG. 1 is a perspective view of one embodiment of the present invention.

As shown in FIG. 1, the present invention includes a container 10 which may house several components of an entertainment system including any required power supply. The container 10 is generally in the form of a six sided polyhedral where the surfaces correspond to the vehicle, i.e. a front panel 12 of the container 10 corresponds to the front of the vehicle and a back panel 14 of the container 10 corresponds to the back of the vehicle, etc. A fight panel 16, a left panel 18, a bottom panel 20 and a top panel 22 complete the container. Each panel may be one piece or a combination of multiple pieces. The various panels may be integral or separate to one another, as required by the particular manufacturing specifications. The panels may be connected in any convenient method including press-fit or other fasteners.

Figure 2:
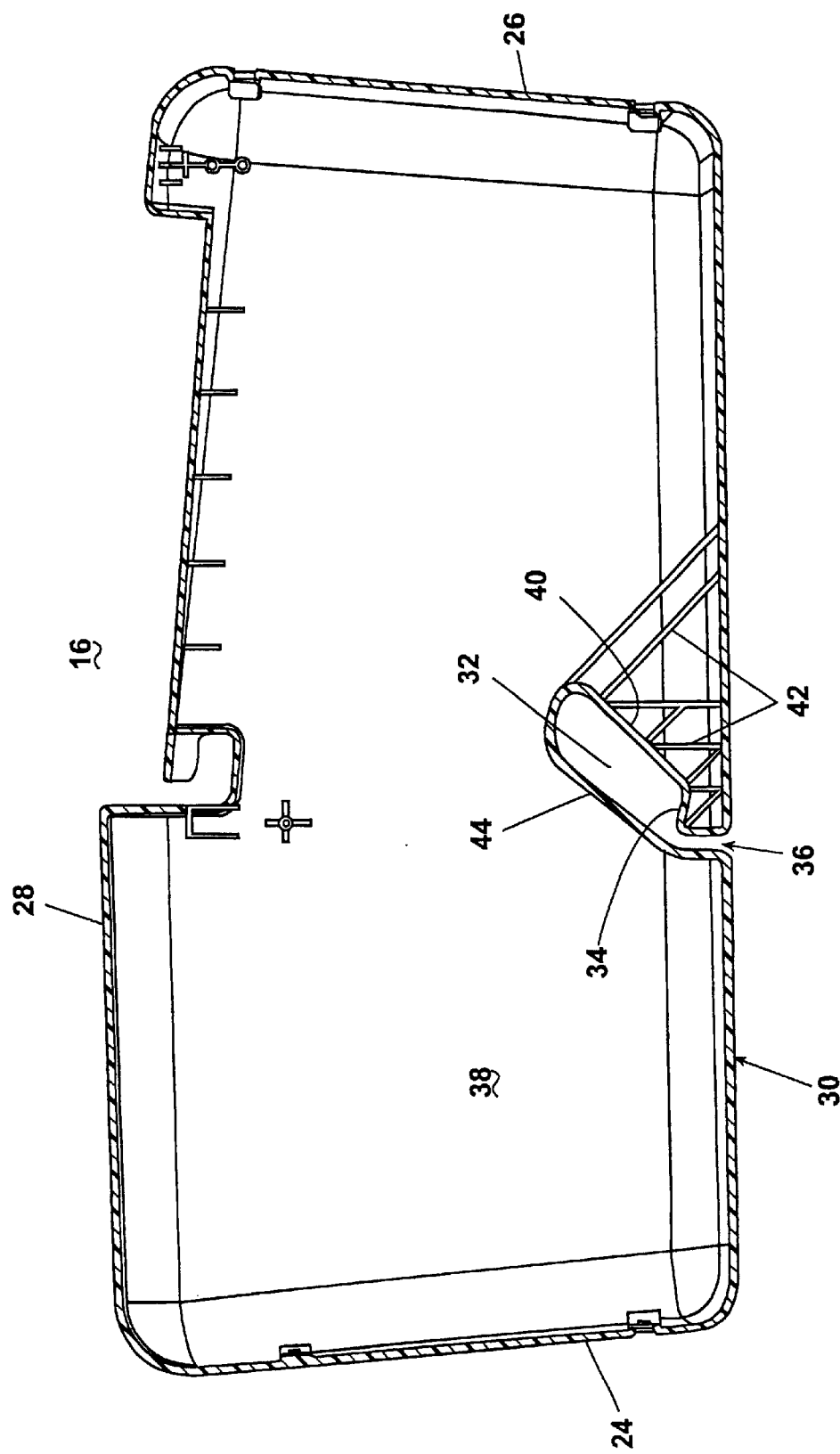
FIG. 2 is an interior view of the right panel of one embodiment of the present invention.

Since the right and left panels are mirror images of each other, only one needs to be discussed in detail. As best seen in FIG. 2, the right panel 16 has a front edge 24, a back edge 26, and top edge 28, and a bottom edge 30 and a cutout 32 with a lip 34 which creates a narrow mouth 36 in bottom edge 30 of the right panel 16. The cutout 32 is shaped such that the seatbelt, once inserted, is maintained within the cutout. One useful shape for the cutout is oblong where the cutout is tilted slightly toward the back edge 26 of the right panel 16. In combination with the lip 34, this rearward tilt helps maintain the seatbelt in the cutout 32.

As best seen in FIG. 2, the right panel 16 has an interior surface 38 on which is a method of strengthening a trailing edge 40 of the cutout 32. The strengthening of the trailing edge may be accomplished by any structure that has high strength-to-weight ratios such as ribs or honeycomb. Preferably, the trailing edge is strengthened by ribs 42. The ribs 42 may take any configuration and size which strengthens the trailing edge. In one useful embodiment, the ribs 42 may be a combination of ribs which are generally perpendicular to the bottom edge 30 of the right panel 16 and ribs which are generally perpendicular to the trailing edge 40. The lip 34 of the cutout 32 may also be strengthened, in a manner similar to the strengthening of the trailing edge. A leading edge 44 of the cutout 32, may, but need not, be strengthened.

Figure 3:
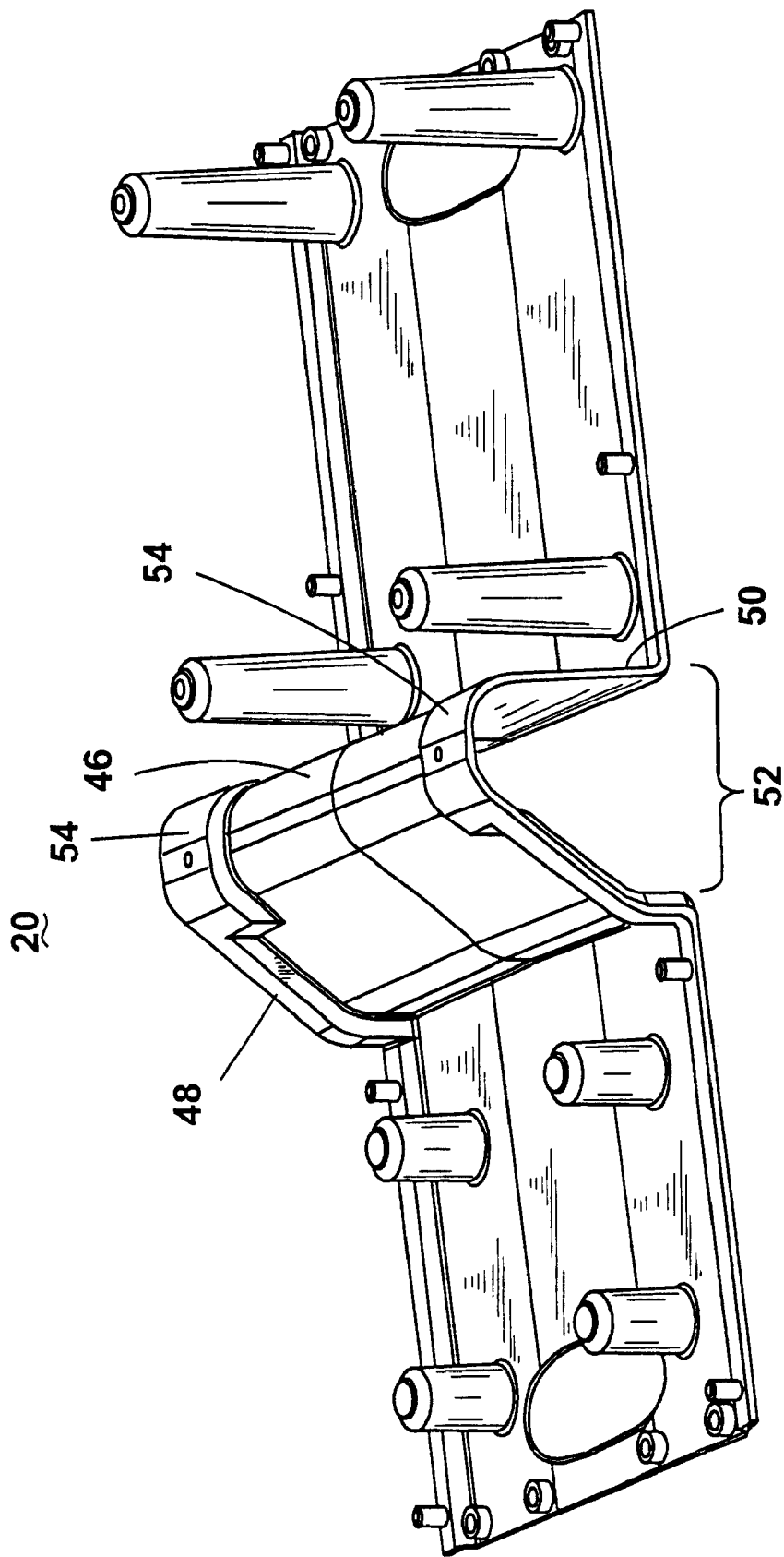
FIG. 3 is a perspective view of the bottom panel of one embodiment of the present invention.

The bottom panel 20 has an channel which is located such that the channel aligns with the cutouts 32 on the right and left panels 16, 18. As best seen in FIG. 3, one useful embodiment of the channel is an archway 46 which is generally U-shaped. Specifically, a leading edge 48 of the archway 46 may correspond to the leading edge 44 of the cutout 32 in the right panel 16 (shown in FIG. 4). The trailing edge 50 of the archway 46 does not necessarily correspond to the trailing edge 40 of the cutout 32 in the right panel 16. In addition, the mouth of the archway 46 need not correspond to the narrow mouth 36 of the right panel 16. In one useful embodiment, the trailing edge 50 of the archway 46 is roughly perpendicular to the bottom panel 20.

Figure 4:
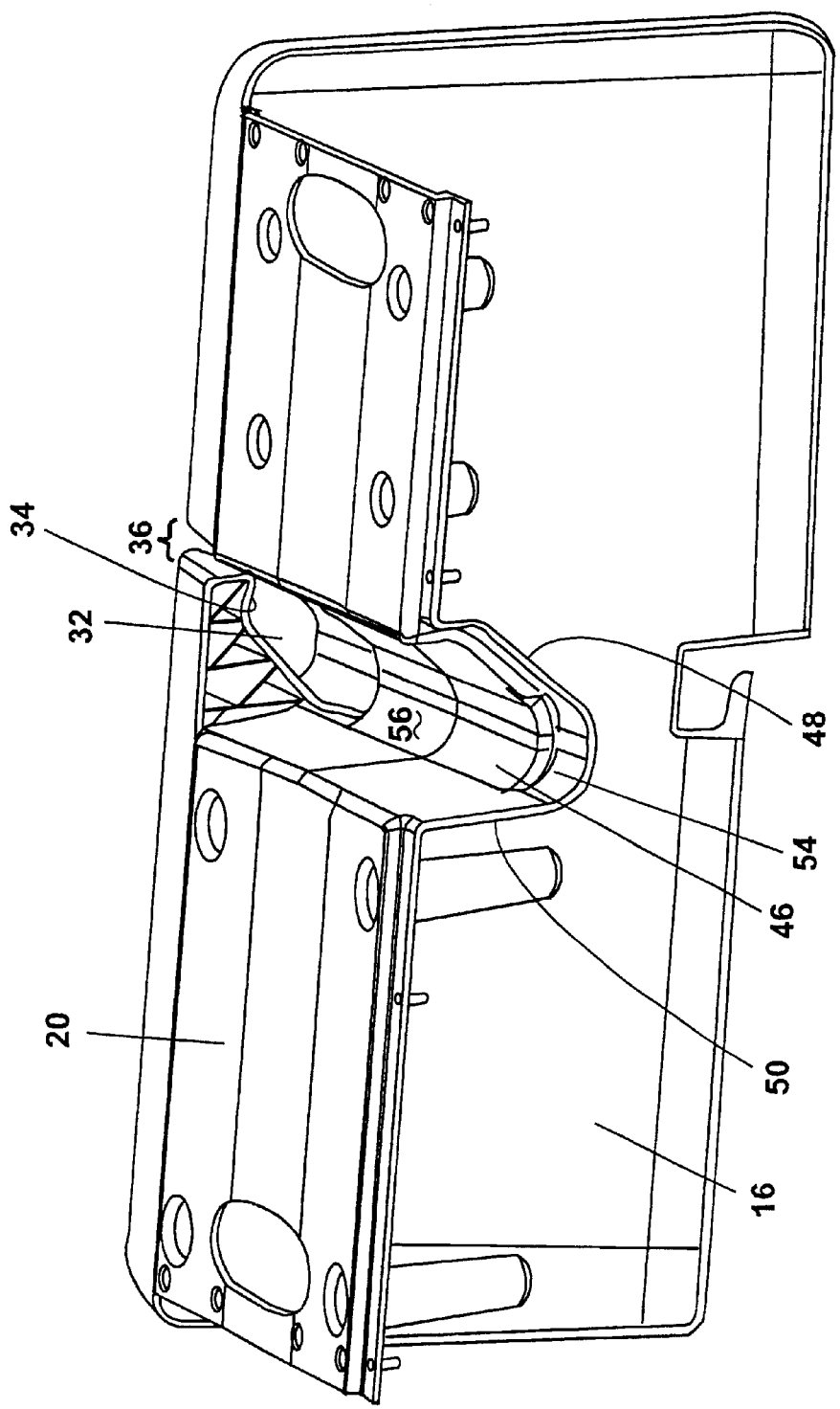
FIG. 4 is a perspective view of the bottom panel connected to the right panel of one embodiment of the present invention.

In one particularly useful embodiment of the channel, the archway 46 has at its ends, flanges 54 which receive the leading edge 44 of the right and left panels 16, 18. As can be seen in FIG. 4, the right panel 16 connects to the bottom panel 20 to partially form a slot 56. The slot 56 is completed by the attachment of the left panel 18. A fastener or other methods may be used to attach flanges 54 to leading edge 44 of the right and left panels 16, 18. This attachment strengthens container 10 because a fixed lap joint is created between leading edge 44 and flange 54.

Figure 5:
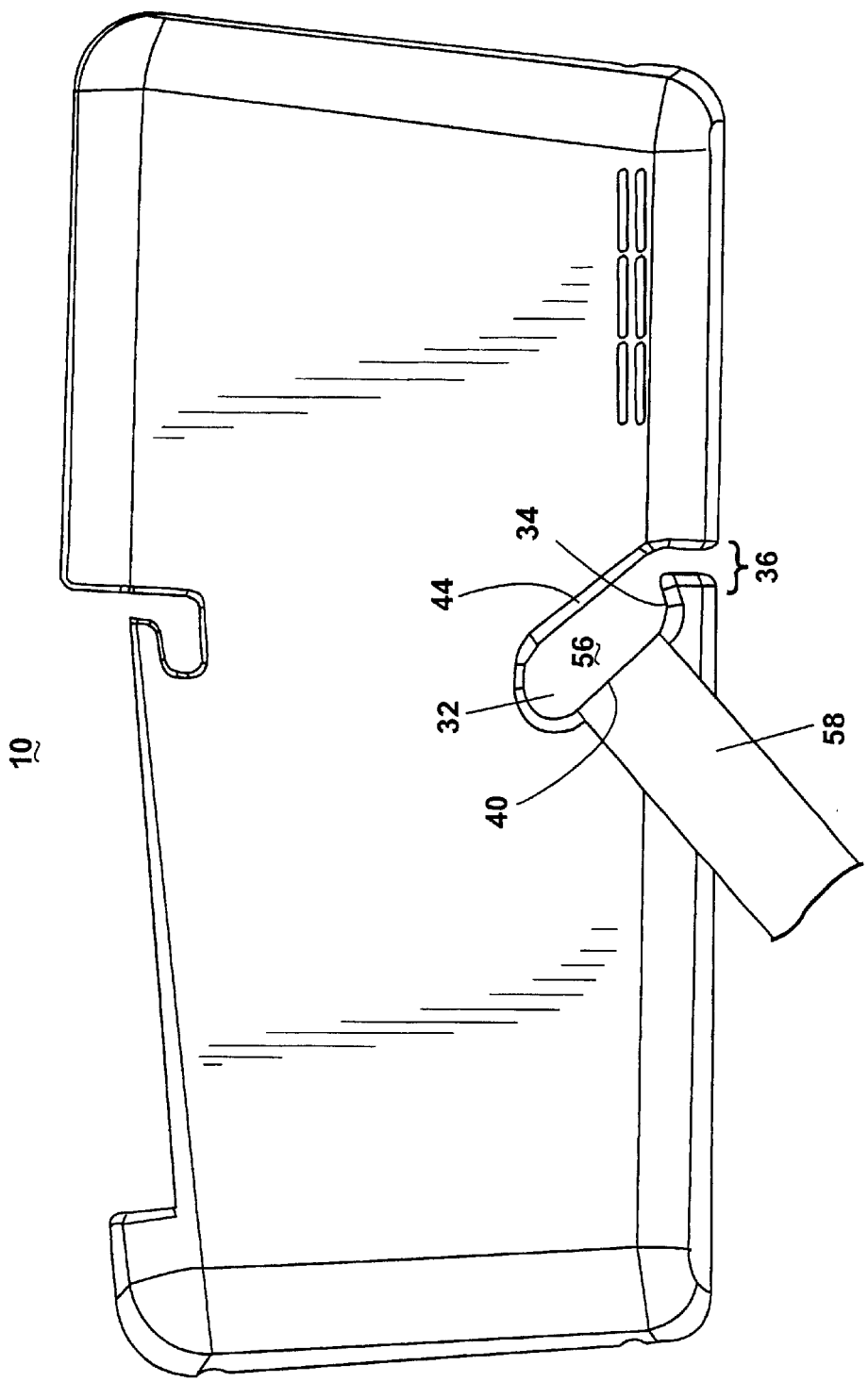
FIG. 5 is an exterior view of the right panel of one embodiment of the present invention.

The slot 56 is adapted to easily accept the lap belt portion of a seat belt. Because of the narrow mouth 36, the belt portion of the seat belt can be slipped into the cutouts. This eliminates the need to thread the seatbelt, including the buckle, through the slot. Instead, the seat belt can be placed across the vehicle seat and the container place on top of the seatbelt such that the belt is received in the cutout 32 through the mouth 36. After tightening, the seatbelt should engage the trailing edge 40 of the cutout 32 on both the right and left panels 16, 18 and reside generally within the slot 56. For secure installation, any slack in the seatbelt should be removed. The lip 34 helps maintain the seatbelt in the cutout. Although it is preferred to buckle the seatbelt first and then install the container, the container may be installed prior to buckling the seat belt. FIG. 5 illustrates where the seatbelt 58 is located on the container 10 after installation.

Figure 6:
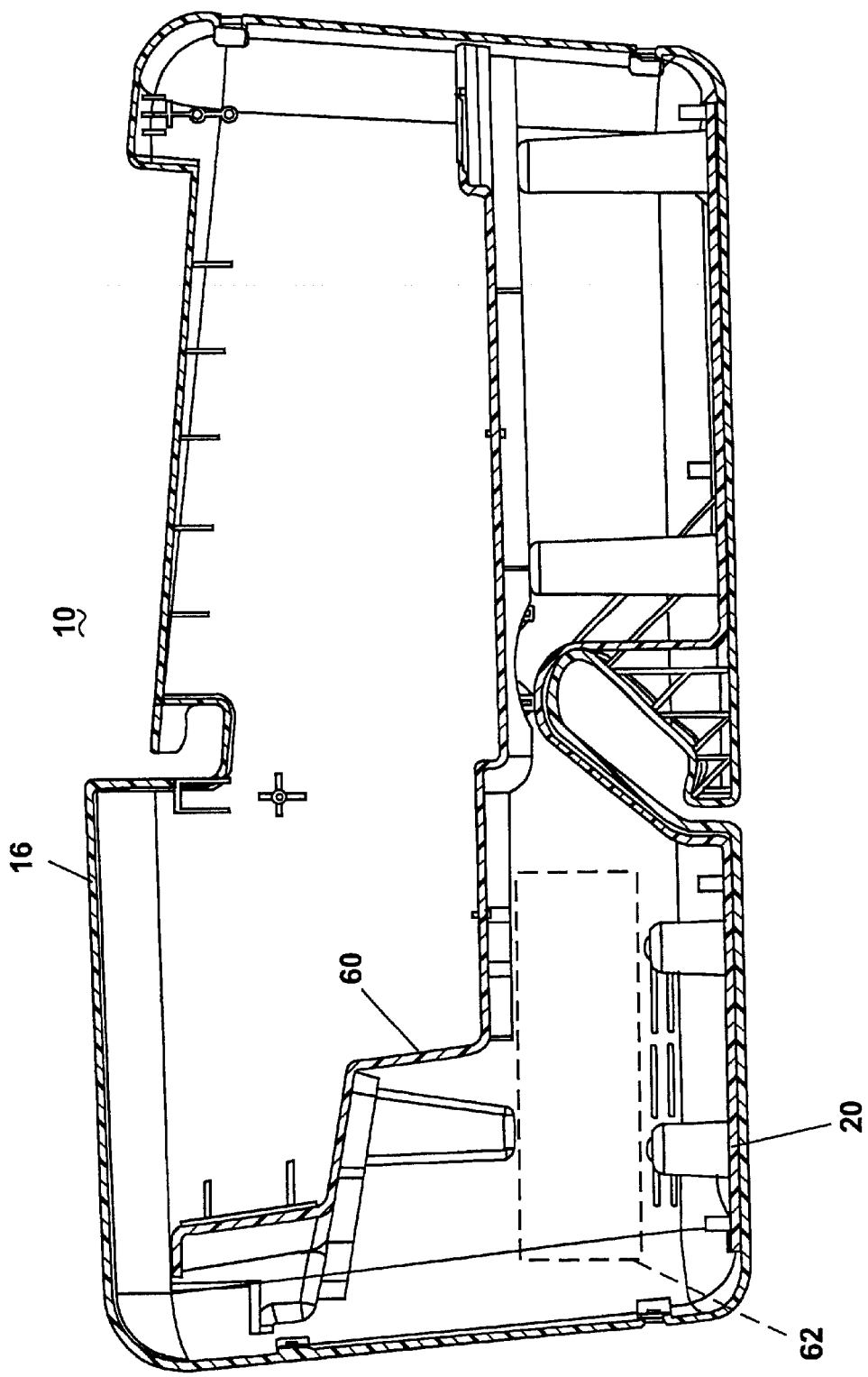
FIG. 6 is an interior view of the right, bottom, and interior panels of one embodiment of the present invention.

Shown in FIG. 6 is the right panel 16 and bottom panel 20 of the container 10 as well as an interior panel 60 which facilitates the organization of components within the container. The interior panel 60 divides up the interior space of the container 10 so that one or more electronic components 62 (shown schematically) may be held in place and separated from other components of the entertainment system.

In an alternate embodiment of the channel, the bottom panel includes a tube instead of an archway. A container utilizing a tube has the disadvantage of requiring the seatbelt, including buckle, be threaded through the entire tube. The awkwardness of this threading through the tube may be offset by increased strength of the container by using a tube. In this embodiment, the cutouts in the right and left panels may not have mouths, but rather be merely orifices in the panels. When the right, left and bottom panels are assembled, the cutouts align with the tube to form a pipe.

In alternate embodiments, the slot in combination with a lap belt may be used to secure other items which have interior compartments to an automobile such as a child safety seat or containers which house other items such as arts and crafts or portable office materials such as paper and pencils.

The container of the present invention may be adapted to hold any electronic component such as VCR's, DVD players, CD players, computers, and video games systems, as well as video display equipment such as screens and TV's and sound equipment such as speakers and microphones. The entertainment system may also include portions dedicated to holding media for the various components as well as remote controls and game controls, as well as any power sources needed to operate the electronic components.

While the invention has been specifically described in connection with certain specific embodiments thereof, it is to be understood that this is by way of illustration and not of limitation, and the scope of the appended claims should be construed as broadly as the prior art will permit.

What is claimed is:

1. A combination and an entertainment system, the container comprising:
   a right and a left panel with a cutout therethrough;
   a bottom panel with a channel; and
   at least one interior compartment adapted to hold one or more components of the system,
   wherein the cutouts of the right and left panels and the channel of the bottom panel align to form a slot wherein each cutout includes a mouth adapted to receive a lap belt portion of a seatbelt, the right and left panels include a lip which substantially closes the mouth of the cutout, and the channel is an U-shaped archway, such that cutouts of the right and left panels and the archway of the bottom panel align to form the slot wherein the cutouts include a trailing edge which is slanted toward a rear edge of the panels.

2. The container of claim 1, wherein the trailing edge of the cutouts is strengthened by ribs.

3. The container of claim 2, wherein the archway includes flanges at either end which are adapted to receive the leading edge of the cutouts.

4. A combination container and an entertainment the container, comprising:
   a right panel with a cutout such that a lip of the right panel substantially closes the cutout;
   a left panel with a cutout such that a lip of the left panel substantially closes a mouth of the cutout;
   a bottom panel with a U-shaped archway; and
   at least one interior compartment adapted to hold one or more components of the system,
   wherein the cutouts of the right and left panels and the archway of the bottom panel align to form a slot adapted to receive a seatbelt wherein the cutouts include a trailing edge which is slanted toward a rear edge of the panels.

5. The container of claim 4, wherein the trailing edge of the cutouts is strengthened by ribs.

6. The container of claim 5, wherein the archway includes flanges at either end which are adapted to receive a leading edge of the cutouts.

7. An entertainment system, comprising:
   at least one component of an electronic entertainment system; and
   a container including cutouts in a right panel and a left panel which combine with a channel in a bottom pane) to form a slot adapted to receive a seatbelt and at least one interior compartment adapted to hold the at least one component, wherein the cutout includes a mouth adapted to receive a lap belt portion of the seatbelt, wherein the right and left panels include a lip which substantially closes the mouth of the cutout, and the channel is an U-shaped archway, such that cutouts of the right and left panels and the archway of the bottom panel align to form the slot.

8. The entertainment system of claim 7, wherein the cutouts include a trailing edge which is slanted toward a rear edge of the panels.

9. The entertainment system of claim 8, wherein the trailing edge of the cutouts is strengthened by ribs.

10. The entertainment system of claim 9, wherein the archway includes flanges at either end which are adapted to receive a leading edge of the cutouts.

* * * * *